(12) United States Patent
Higashijima et al.

(10) Patent No.: US 8,312,321 B2
(45) Date of Patent: *Nov. 13, 2012

(54) STORAGE CONTROL APPARATUS AND FAILURE RECOVERY METHOD FOR STORAGE CONTROL APPARATUS

(75) Inventors: Naoki Higashijima, Machida (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 12/963,313

(22) Filed: Dec. 8, 2010

(65) Prior Publication Data

US 2011/0078495 A1 Mar. 31, 2011

Related U.S. Application Data

(63) Continuation of application No. 12/467,611, filed on May 18, 2009, now Pat. No. 7,877,632, which is a continuation of application No. 11/581,421, filed on Oct. 17, 2006, now Pat. No. 7,549,084.

(30) Foreign Application Priority Data

Aug. 25, 2006 (JP) ................................. 2006-229034

(51) Int. Cl.
*G06F 11/00* (2006.01)
(52) U.S. Cl. ........................................................ 714/23
(58) Field of Classification Search .................. 714/4.11, 714/4.12, 4.2, 4.3, 6.13, 6.2, 6.3, 6.32, 23, 714/42, 54
See application file for complete search history.

(56) References Cited

U.S. PATENT DOCUMENTS

| | | | |
|---|---|---|---|
| 6,057,974 A | 5/2000 | Sukigara et al. | |
| 6,249,828 B1 | 6/2001 | Wallach et al. | |
| 6,463,505 B2 | 10/2002 | Katsuragi et al. | |
| 7,210,061 B2* | 4/2007 | Anderson | 714/5.11 |
| 7,360,018 B2 | 4/2008 | Higashijima et al. | |
| 7,434,090 B2* | 10/2008 | Hartung et al. | 714/6.2 |
| 7,451,346 B2* | 11/2008 | Katsuragi et al. | 714/6.22 |
| 7,877,632 B2* | 1/2011 | Higashijima et al. | 714/23 |
| 2001/0056438 A1* | 12/2001 | Ito | 707/204 |
| 2002/0049923 A1 | 4/2002 | Kanazawa et al. | |
| 2003/0172328 A1 | 9/2003 | Wyatt et al. | |
| 2004/0006572 A1 | 1/2004 | Hoshino et al. | |
| 2005/0015160 A1* | 1/2005 | Hashimoto et al. | 700/20 |
| 2005/0114728 A1 | 5/2005 | Aizawa et al. | |
| 2006/0075283 A1 | 4/2006 | Hartung et al. | |
| 2006/0101202 A1 | 5/2006 | Mannen et al. | |
| 2006/0218343 A1 | 9/2006 | Higashijima et al. | |
| 2007/0094456 A1 | 4/2007 | Matsui et al. | |

FOREIGN PATENT DOCUMENTS

JP 3-268019 A 11/1991

(Continued)

*Primary Examiner* — Nadeem Iqbal
(74) *Attorney, Agent, or Firm* — Mattingly & Malur, PC

(57) ABSTRACT

A storage control apparatus of the present invention reduces the frequency of disk drive failures. An error management part manages the number of times errors occur in respective disk drives. A disk drive in which the number of errors meets or exceeds a threshold value is selected as a disk drive to be restarted. A restart control part commences difference management prior to restarting the disk drive targeted for restart. A difference management part manages parity group-related update locations using a difference bitmap. After commencing difference management, the restart control part restarts the disk drive in which the error was detected. This makes it possible to resolve an error caused by a firmware hangup or the like.

20 Claims, 12 Drawing Sheets

FOREIGN PATENT DOCUMENTS

| | | |
|---|---|---|
| JP | 10-149262 | 6/1998 |
| JP | 11-191037 | 7/1999 |
| JP | 2000-227839 A | 8/2000 |
| JP | 2000227839 A | 8/2000 |
| JP | 2002-23967 A | 1/2002 |
| JP | 2003-303052 | 10/2003 |
| JP | 2005-157739 A | 6/2005 |

* cited by examiner

FIG. 6

PARITY GROUP MANAGEMENT TABLE — T2

| PARITY GROUP # | RAID LEVEL | FREE SPACE (GB) | TOTAL SIZE (GB) | LU# | DRIVE LIST |
|---|---|---|---|---|---|
| 1 | 5 | 100 | 1000 | 1,2,3,4 | 1,2,3,4 |
| 2 | 1 | 200 | 1000 | 5,6 | 5,6,7,8 |
| 3 | 5 | 0 | 1000 | 7,8,9 | 9,10,11,12 |
| ... | ... | ... | ... | ... | ... |

STORAGE CONTROL APPARATUS AND FAILURE RECOVERY METHOD FOR STORAGE CONTROL APPARATUS

CROSS-REFERENCE TO PRIOR APPLICATION

This is a continuation application of U.S. Ser. No. 12/467,611, filed May 18, 2009 (now U.S. Pat. No. 7,877,632), which is a continuation application of U.S. Ser. No. 11/581,421, filed Oct. 17, 2006 (now U.S. Pat. No. 7,549,084), which claims priority from Japanese Patent Application No. 2006-229034, filed on Aug. 25, 2006, the entire disclosures of all of the above-identified applications are hereby incorporated by reference.

BACKGROUND OF THE INVENTION

1. Field of the Invention

The present invention relates to a storage control apparatus, and a failure recovery method for a storage control apparatus.

2. Description of the Related Art

To handle large varieties and volumes of data, governments and other public agencies and offices, municipalities, companies, and educational institutions, for example, manage data using relatively large-scale storage control apparatuses. This storage control apparatus constitutes a storage area that comprises redundancy by virtue of redundant information (RAID: Redundant Array of Independent Disks), and stores data in this storage area (Japanese Patent Laid-open No. 10-149262).

In a storage control apparatus such as this, data is divided into prescribed sizes and respectively distributed and stored in a plurality of storage devices. Then, parity is calculated on the basis of the divided data, and this parity is stored in a storage device. Accordingly, should any one piece of data be lost, it is possible to reproduce (recover) the lost data on the basis of the other data and parity.

For example, when a failure occurs in a storage device, and it become impossible to read and write data, a correction copy is executed. Correction copy is a technique for restoring all data stored in a failed storage device on the basis of the data and parity in a normal storage device within a parity group (also called an ECC (Error Correcting Code) group, or RAID group), and storing all of this restored data in a spare storage device (Japanese Patent Laid-open No. 11-191037).

Furthermore, technology, which is constituted such that the setup of various equipment in a storage system can be performed automatically based on policy that a user specifies in advance, is also known (Japanese Patent Laid-open No. 2003-303052).

In the prior art, when a failure occurs in a storage device, and the reading and writing of data becomes impossible, executing a correction copy transfers the data stored in the failed storage device to a spare storage device. When correction copy is complete, the spare storage device is used in place of the failed storage device. Then, the failed storage device is removed from the storage control apparatus and returned to the repair shop.

In the past, when a failure was detected in a storage device, the storage device in which the failure occurred was immediately detached from the storage control apparatus, and a spare storage device was used in its place. However, there are a variety of types of storage device failures, such as a physical failure and a logical failure, and there are also cases in which a storage device will recover to its normal state by simply restarting it. For example, when firmware hangup occurs inside a storage device, the storage device can most often be restored to its normal state by simply being restarted.

Even in cases when it is possible to recover from a failure by simply restarting the storage device, failure recovery still takes time because the storage device in which this failure occurred is isolated, and a spare storage device is used in its place. This is due to the fact that all the data stored in the failed storage device is restored via a correction copy, and this restored data must be stored on the spare storage device.

In a correction copy, the data, which is stored in a storage device in which a failure has occurred, is restored by reading out predetermined amounts of data and parity, respectively, from a normal storage device inside the parity group, and performing a logic operation based on this read-out data and parity. Then, this restored data is written to a spare storage device. This kind of processing, involving data and parity readouts, a logic operation, and a write to a spare storage device, must be executed repeatedly for all the data stored in a failed storage device. Therefore, failure recovery takes time, and also increases the load placed on the storage control apparatus.

Further, using a spare storage device each time there is a failure, from which recovery is possible by simply restarting the storage device, increases the frequency at which storage devices are replaced, thus adding to the operating and maintenance costs of the storage control apparatus.

SUMMARY OF THE INVENTION

Accordingly, an object of the present invention is to provide a storage control apparatus and a failure recovery method for a storage control apparatus, which make it possible to lower the replacement frequency of storage devices. Another object of the present invention is to provide a storage control apparatus and a failure recovery method for a storage control apparatus, which make it possible to lower the replacement frequency of storage devices by enabling failure recovery to be carried out in a short period of time by virtue of restarting the storage device, and by using a spare storage device only in the case of a failure, which cannot be recovered from by simply restarting the storage device. Yet other objects of the present invention should become clear from the descriptions of the embodiments, which will be explained hereinbelow.

A storage control apparatus according to the present invention, which is designed to solve for the above-mentioned problems, comprises a plurality of storage devices, and a controller for controlling the respective storage devices. The controller comprises a command processing part, which processes a command received from a host computer, and sends the results of processing to the host computer; an error management part, which manages each error generated by the respective storage devices, and detects a prescribed storage device for restart based on the state of error generation; a restart control part, which restarts a prescribed storage device detected by the error management part; and a difference management part, which manages an update location via a write command when the command processing part processes a write command related to the parity group of the prescribed storage device within a prescribed difference management period comprising a period for the prescribed storage device to restart. The restart control part, after the difference management period has ended, restores the data of an update location based on data stored respectively in storage devices other than the prescribed storage device within the parity group, and writes this restored data to the prescribed storage device.

In a mode of the present invention, the command processing part (1) writes data respectively to storage devices other than the prescribed storage device within the parity group, when a write command related to the parity group is received from a host computer during the difference management period, and (2) when a read command related to the parity group is received from a host computer during the difference management period, restores the read data requested by the host computer based on the data stored respectively in storage devices other than the prescribed storage device within the parity group, and sends this restored read data to the host computer.

In a mode of the present invention, the error management part, from among the storage devices, detects as a prescribed storage device, a storage device for which the number of preset prescribed errors has reached a preset prescribed threshold value.

In a mode of the present invention, the start time of a difference management period is set prior to the point in time when the power to the prescribed storage device is turned OFF by the restart control part, and the end time of the difference management period is set after the point in time when the power to the prescribed storage device is turned ON.

In a mode of the present invention, the start time of a difference management period is set at a point in time prior to the point in time at which the power to the prescribed storage device is turned OFF by the restart control part, and the end time of the difference management period is set to either one of a point in time at which the prescribed storage device is restarted normally, or a point in time subsequent to the point in time at which the prescribed storage device is restarted normally.

In a mode of the present invention, the restart control part restarts the prescribed storage device only when the respective storage devices of the parity group are operating.

In a mode of the present invention, the plurality of storage devices comprise at least one or more spare storage devices, and the restart control part, when the prescribed storage device does not restart normally, selects a spare storage device in place of the prescribed storage device, and, on the basis of all the data stored respectively in the storage devices other than the prescribed storage device within the parity group, restores all the data to be stored in the prescribed storage device, which has not restarted normally, and stores all this restored data in the spare storage device.

In a mode of the present invention, the plurality of storage devices are mounted in a non-replaceable condition on the inside of the casing.

A failure recovery method for a storage control apparatus according to another aspect of the present invention is a method for recovering from a failure of a storage control apparatus, which comprises a plurality of storage devices, and a controller for controlling the respective storage devices, the failure recovery method respectively executing the steps of managing each error that occurs in the respective storage devices, and detecting the prescribed storage device to be restarted on the basis of the error generation state; commencing difference management related to the parity group of the prescribed storage device; restarting the prescribed storage device; confirming whether or not the prescribed storage device restarted normally; halting difference management when the prescribed storage device restarted normally; and restoring difference-managed data on the basis of data stored respectively in storage devices other than the prescribed storage device within the parity group, and writing this restored data to the prescribed storage device.

The failure recovery method can also comprise the additional steps of selecting a spare storage device prepared in advance when the prescribed storage device does not restart normally; restoring all the data to be stored in the prescribed storage device, which has not restarted normally, based on all the data stored respectively in storage devices other than the prescribed storage device within the parity group; and storing all this restored data in the spare storage device.

There will be circumstances under which all or a part of the means, functions, and steps of the present invention are capable of being constituted as a computer program, which is executed by a computer system. When all or a part of the constitution of the present invention is constituted from a computer program, this computer program, for example, can be affixed to various types of storage media and distributed, or it can also be sent via a telecommunications network.

BRIEF DESCRIPTION OF THE DRAWINGS

FIG. 6 is a diagram showing the configuration of a table for managing a parity group;

DETAILED DESCRIPTION OF THE PREFERRED EMBODIMENT

Figure 1:
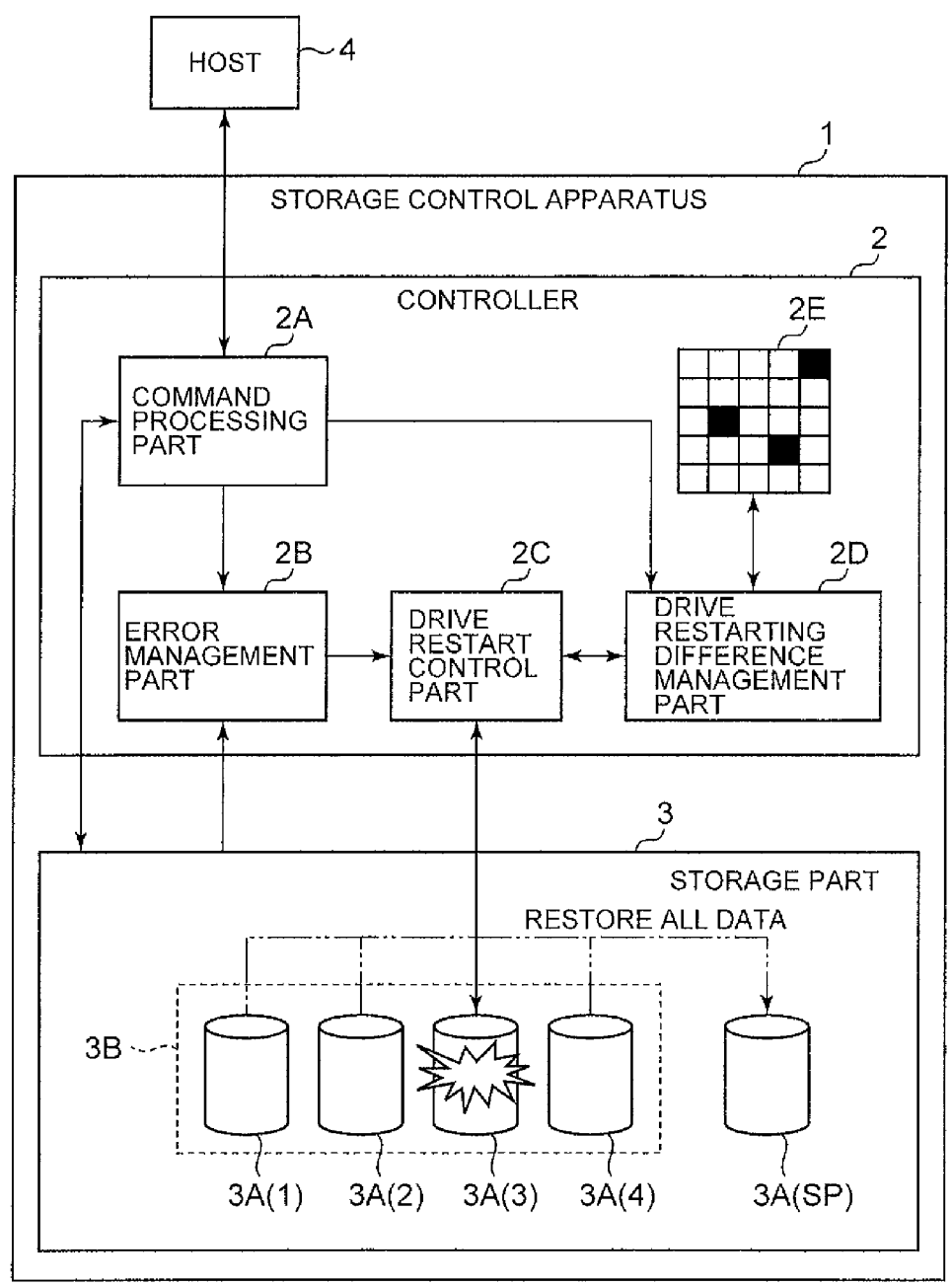
FIG. 1 is a diagram schematically showing an overall concept of the present invention.

FIG. 1 is a block diagram showing the overall concept of an embodiment of the present invention. In this embodiment, as will be explained hereinbelow, when a failure is detected in a disk drive 3A(3), the disk drive 3A(3) in which the failure was detected is not immediately stopped and replaced with a spare disk drive, but rather, first, the disk drive 3A(3) is restarted. This is because, when a firmware hangup occurs inside a disk drive 3A(3), for example, there is a good possibility that the disk drive 3A(3) will operate normally by simply restarting it.

When the disk drive 3A(3) in which the failure occurred is restarted, difference management, which uses a difference bitmap 2E, is carried out for the parity group 3B of the disk drive 3A(3). When the restarting of the disk drive 3A(3) ends normally, the difference data generated during the restart period is restored, and this difference data is stored in the disk drive 3A(3).

The constitution of the storage control apparatus 1 shown in FIG. 1 will be explained. The storage control apparatus 1, for example, is constituted comprising a controller 2, and a storage part 3. The controller 2 is connected respectively to a host 4 and the storage part 3. The controller 2 accesses the storage part 3 in response to a command received from the host 4, and executes data input/output processing.

The storage part 3 comprises a plurality of disk drives 3A(1) through 3A(4), and a spare disk drive 3A(SP). In the following explanation, except when specifically differentiated, these disk drives will be called disk drive 3A. Each disk drive 3A is equivalent to a "storage device." Various types of devices can be used as a disk drive 3A, to include, for example, a hard disk drive, semiconductor memory device (flash memory device), optical disk drive, magneto-optic disk drive, flexible disk drive, and magnetic tape drive. In the explanation below, the present invention will be explained giving a hard disk drive as an example.

A single parity group 3B is made up of a plurality of disk drives 3A. The parity group 3B, as is known from RAID5, RAID6, and so forth, maintains the redundancy of data. For example, in the case of a parity group 3B of 3D+1P, three disk drives 3A are used as data disks for storing data, and one disk drive 3A is used as a parity disk for storing parity. Furthermore, in the case of RAID5, parity is written to the respective disk drives 3A in order.

For explanation purposes, the present invention will be explained using a 3D+1P parity group as an example. Write data received from the host 4 is divided into three pieces of data, and these divided data are written to sectors of the respective disk drives 3A used as data disks. The controller 2 calculates parity by determining the exclusive OR of each data when the respective data are written to the respective disk drives 3A. The calculated parity is written to the disk drive 3A used as the parity disk.

When the data stored in a disk drive 3A is updated, the controller 2 reads out from the disk drive 3A the old data and old parity to be updated, and calculates a new parity. The new parity is calculated by determining the exclusive OR of the old parity, the old data to be updated, and the new data. Or, the new parity can also be calculated from the exclusive OR of another group of data other than the data to be updated, and the new data. However, since all of the old data is read out in this calculation method, it takes a long time to calculate a new parity when there are a large number of data disks. By contrast, when a new parity is calculated from an old parity, old data and new data, a new parity can be obtained no matter how many data disks there are.

After calculating a new parity, the controller 2 overwrites the old data with the new data, and stores the new parity. Here, since a prescribed ECC bit is added to the respective pieces of data stored in the respective disk drives 3A, a minor bit error can be restored automatically. However, when a bit error occurs that exceeds the restoration capabilities of the ECC, data cannot be read out normally from a disk drive 3A.

This kind of error is called an uncorrectable error. When an uncorrectable error occurs, the controller 2 reads other data related to the data that failed to be read out and the parity. The controller 2 reproduces the data that failed to be read out by determining the exclusive OR of the parity and respective data read out from normal disk drives 3A. The process, which restores data based on data and parity read out from a normal disk drive 3A, is called a correction copy.

As described hereinabove, in the case of a RAID5, when a failure occurs in any one of the disk drives 3A that make up the parity group 3B, the data stored in the disk drive 3A in which the failure occurred can be restored by virtue of the data and parity stored in the other disk drives 3A.

Next, the functional components of the controller 2 will be explained. The controller 2, for example, comprises a command processing part 2A, error management part 2B, drive restart control part 2C, drive restarting difference management part (hereinafter, difference management part) 2D, and difference bitmap 2E.

The command processing part 2A processes a command received from a host 4 as the "host computer" and sends the results of this processing to the host 4. A write command and a read command, for example, can be cited as commands.

The error management part 2B manages the errors that occur in the respective disk drives 3A. The error management part 2B determines a disk drive 3A to be restarted on the basis of the error generation state. The error management part 2B manages the number of times a preset plurality of types of errors occur in each disk drive 3A. Then, when the number of any one type of error reaches a preset prescribed threshold value, the error management part 2B detects this disk drive 3A as the disk drive to be restarted. This is because of the likelihood that a failure will occur in the disk drive 3A for which the number of errors reaches the threshold value, making it impossible to use. Accordingly, the error management part 2B is constituted so as to detect the predictors of a failure based on the number of errors, and to select the disk drive 3A to be restarted. In the example shown in FIG. 1, when the number of errors in a disk drive 3A(3) reaches the threshold value, the disk drive 3A(3) is detected as the disk drive to be restarted.

The drive restart control part (hereinafter, restart control part) 2C restarts the restart-targeted disk drive 3A (3) selected by the error management part 2B. Disk drive 3A restart, for example, signifies an operation, in which the power to this disk drive 3A is turned OFF, and afterwards, the power to this disk drive 3A is turned ON. In addition, when a disk drive 3A comprises an input terminal for a reset signal, it is also possible to restart the disk drive 3A by inputting a reset signal to the disk drive 3A.

The difference management part 2D, using a difference bitmap 2E, manages difference data generated within a prescribed difference management time period. The difference bitmap 2E, for example, manages updates in prescribed management units, such as blocks or tracks. When the data of disk drives 3A(1), 3A(2) and 3A(4) of parity group 3B is rewritten within the difference management period, the difference management part 2D stores the data locations that were rewritten in the difference bitmap 2E.

Here, the start time of the difference management period can be set prior to the commencement of restart, and the end time of the difference management period can be set subsequent to the completion of restart. The purpose for commencing difference management prior to restarting the disk drive 3A(3) is to manage the data more securely. If disk drive 3A(3) restart and difference management are executed simultaneously, theoretically, no data will be lost relative to the disk drive 3A(3). However, if even a minor timing discrepancy occurs, there is the likelihood that difference management will commence after the disk drive 3A(3) is restarted. In this case, a parity mismatch will occur for write data, which the command processing part 2A received, between the commencement of disk drive 3A(3) restart and the commencement of difference management. This is because, despite the fact that the data was updated, parity related to the updated data was not generated.

Accordingly, in this embodiment, difference management related to the parity group 3B is commenced prior to restarting the disk drive 3A(3). Furthermore, when difference management is commenced prior to restart, difference management is needlessly carried out during the period from the commencement of difference management to the commencement of restart. Therefore, it is desirable to shorten the delay time between the commencement of difference management and the commencement of restart.

For example, when the number of errors generated in disk drive 3A(3) has apparently reached the threshold value due to a firmware hangup in the disk drive 3A(3), it is highly possible that the disk drive 3A(3) will return to normal by restarting the disk drive 3A(3). This is because there is a good possibility that a restart will cancel the hangup state, and the firmware will operate normally.

When the disk drive 3A(3) returns to the normal state, the restart control part 2C writes difference data, which is managed by the difference management part 2D, to the disk drive 3A(3) via a correction copy. That is, the restart control part 2C uses a correction copy to restore only the difference data during the restart period, and writes this restored data to a prescribed location in the disk drive 3A(3).

If the disk drive 3A(3) fails to return to the normal state despite being restarted, the restart control part 2C utilizes a spare disk drive 3A (SP). The restart control part 2C restores all data stored in the disk drive 3A(3) based on all the data and all the parity stored in the disk drives 3A(1), 3A(2), 3A(4) other than the failed disk drive 3A(3). Then, the restart control part 2C stores all the restored data in the spare disk drive 3A(SP). Thereafter, the spare disk drive 3A(SP) is used as the disk drive 3A(3).

Thus, according to this embodiment, when errors in excess of the threshold value are detected in the disk drive 3A(3), first of all, the present invention restarts the disk drive 3A(3), and confirms whether or not it returns to the normal state. Then, it manages the difference data during the restart period of the disk drive 3A(3), and when the disk drive 3A(3) returns to the normal state, stores only the difference data in the disk drive 3A(3) using a correction copy.

Therefore, in this embodiment, even when errors in excess of the threshold value are detected in a disk drive 3A(3), there is no need to immediately isolate this disk drive 3A(3), and replace it with the spare disk drive 3A(SP). Thus, in this embodiment, the frequency of disk drive 3A replacement can be reduced. In other words, in this embodiment, attempting to recover via a restart a disk drive that was simply treated as a failed disk in the past ultimately lowers the frequency at which failures occur.

In this embodiment, because the constitution is such that only difference data of during the restart period is written to the disk drive 3A(3) that returned to the normal state by virtue of a restart, it is possible to shorten the recovery time of the disk drive 3A(3), and to reduce the load on the storage control apparatus 1.

In this embodiment, the constitution is such that the spare disk drive 3A(SP) is used only when the disk drive 3A(3), in which errors in excess of the threshold value were detected, does not return to the normal state despite being restarted. Therefore, it is possible to reduce the number of times the spare disk drive 3A(SP) is used. Thus, it is not necessary to mount a large number of spare disk drives 3A(SP) to the storage control apparatus 1 in advance. Since the frequency of replacement at error detection is low, disk failure can be endured even when a small number of spare disk drives 3A(SP) are mounted.

In particular, for example, even when the structure of the storage control apparatus 1 makes replacement either difficult or impossible for a disk drive 3A user, the low frequency of disk device 3A replacement enables the time until all spare disk drives 3A(SP) are used to be lengthened, making it possible to lengthen the life and heighten the usability of the storage control apparatus 1. This embodiment will be explained in more detail below.

First Embodiment

Figure 2:
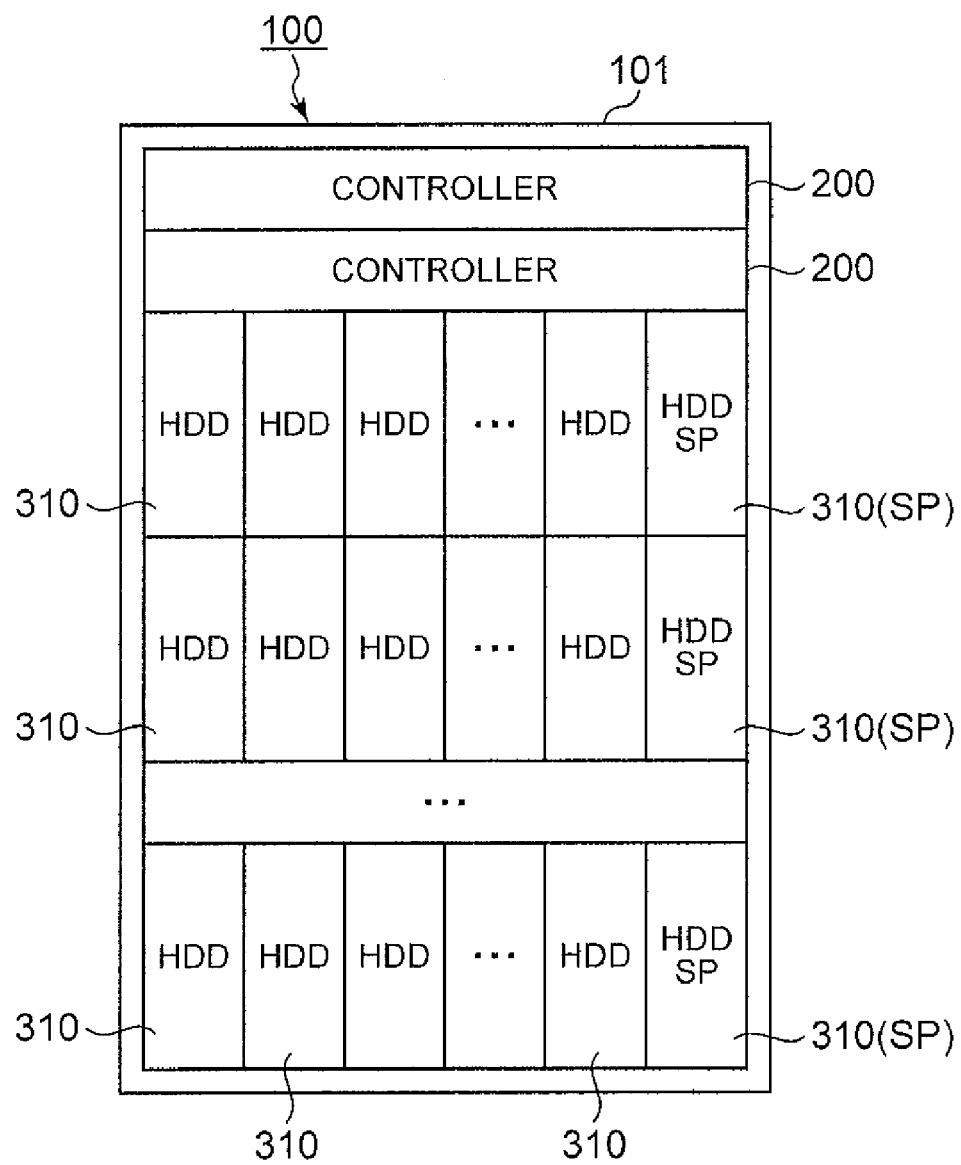
FIG. 2 is a diagram schematically showing a front view of a storage control apparatus.

FIG. 2 is a front view schematically depicting a storage control apparatus 100 according to this embodiment. A plurality of controllers 200, and a large number of disk drives 310 are respectively disposed in the casing 101 of the storage control apparatus 100. Here, the storage control apparatus 100 corresponds to the storage control apparatus 1 in FIG. 1, the controllers 200 correspond to the controller 2 in FIG. 1, and the disk drives 310 correspond to the disk drives 3A in FIG. 1, respectively.

For example, a plurality of controllers 200 are disposed in the upper part of the casing 101. The constitution of the controllers 200 will be explained hereinbelow. The control structure of the storage control apparatus 100 is made redundant by the plurality of controllers 200.

A large number of disk drives 310 are provided below the controllers 200. Then, for example, a spare disk drive 310(SP) is provided for each of a prescribed number of disk drives 310. In addition, this is one example of the arrangement of the above-mentioned controllers 200 and disk drives 310, and the present invention is not limited to this. The storage control apparatus 100 can be comprised of at least one or more controllers 200, a plurality of disk drives 310, and at least one or more spare disk drives 310(SP).

Figure 3:
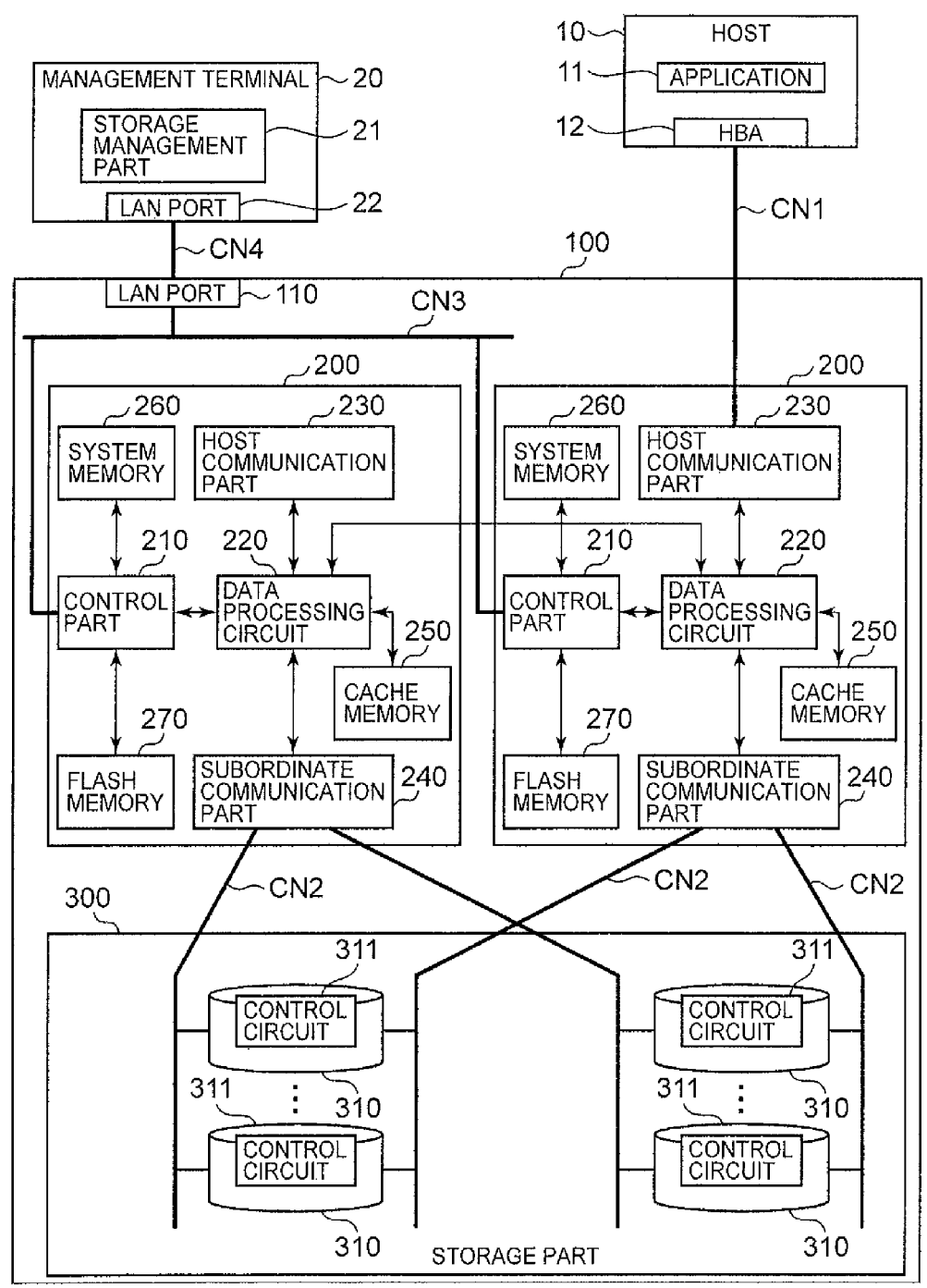
FIG. 3 is a block diagram showing the hardware configuration of a storage control apparatus.

FIG. 3 is an illustration showing the hardware configuration of the storage control apparatus 100. A host 10 and a management terminal 20 are respectively connected to the storage control apparatus 100.

The host 10 corresponds to the host 4 in FIG. 1. The host 10, for example, is a computer system, which is comprised of a CPU (Central Processing Unit), a memory, and other such information processing resources, and, for example, is constituted as a personal computer, a workstation, or a mainframe computer. The host 10, for example, comprises an application program 11, and an HBA (Host Bus Adapter) 12 for accessing the storage control apparatus 100 via a communication network CN1.

As the communication network CN1, for example, a LAN (Local Area Network), SAN (Storage Area Network), the Internet, a leased line, or a public switched network can be used as needed in accordance with circumstances. When the communication network CN1 is a LAN, the HBA12, for example, is a LAN network card. When the communication network CN1 is a SAN, the HBA12, for example, is a host bus adapter.

Furthermore, when the host 10 is constituted as a mainframe computer, the host 10, for example, will carry out data transmission in accordance with a communication protocol, such as FICON (Fibre Connection: registered trademark), ESCON (Enterprise System Connection: registered trademark), ACONARC (Advanced Connection Architecture: registered trademark), and FIBARC (Fibre Connection Architecture: registered trademark).

The management terminal 20 is a computer system for managing the configuration of the storage control apparatus 100, and, for example, is operated by a system administrator or other such user. The management terminal 20 is connected to the storage control apparatus 100 via a communication network CN4. The management terminal 20, for example, is constituted comprising a storage management part 21, and a LAN port 22 for connecting to the communication network CN4. The storage management part 21, for example, is software for providing a variety of instructions to the storage control apparatus 100. Control information, tables, and so forth inside the storage control apparatus 100 can be rewritten in accordance with the instructions from the storage management part 21. The storage management part 21 can also acquire various information from the storage control apparatus 100, and display it on the terminal screen of the management terminal 20.

The storage control apparatus 100 can be broadly divided into a plurality of controller 200, and a storage part 300. The controllers 200 process commands from the host 10, and perform data input/output to the storage part 300. The controllers 200 are duplexed, and each comprises the same constitution.

Accordingly, one of the duplexed controllers 200 will be explained. The controller 200, for example, can be constituted comprising a control part 210, data processing circuit 220, host communication part 230, subordinate communication part 240, cache memory 250, system memory 260, and flash memory 270.

The control part 210, for example, is constituted comprising one or more CPUs. The control part 210 controls the overall operation of the controller 200 by reading out and executing program code stored in the flash memory 270. The control part 210 can utilize system memory 260 when executing program code.

The data processing circuit 220 is a hardware circuit, which controls data input/output. The data processing circuit 220 stores write data received from the host 10 in the storage part 300, reads out read data requested by the host 10 from either one of the storage part 300 or the cache memory 250, and sends it to the host 10.

The control part 210 and data processing circuit 220 are connected, and the control part 210 can connect to the cache memory 250 and so forth via the data processing circuit 220. Further, the data processing circuit 220 of the one controller 200 and the data processing circuit 220 of the other controller 200 are interconnected, thus enabling interactive operations between the controllers 200.

The host communication part 230 is for carrying out communications with the host 10. The host communication part 230 can connect to a plurality of hosts 10, and can carry out communications with each host 10 independently. The subordinate communication part 240 is for carrying out communications with the storage part 300. The subordinate communication part 240 is connected respectively to a plurality of disk drives 310 by way of a plurality of paths CN2. Write data, which the host communication part 230 receives from a host 10, is stored in cache memory 250, and thereafter is written to a prescribed disk drive 310 via the subordinate communication part 240. Data, which the subordinate communication part 240 read out from the prescribed disk drive 310, is stored in the cache memory 250, and thereafter is sent to the host 10 via the host communication part 230.

Furthermore, the control parts 210 of the respective controllers 200 are connected to the LAN port 110 by a LAN or other communication network CN3. The LAN port 110 is for carrying out communications with the management terminal 20. The respective control parts 210 can communicate with each other via the communication network CN3. Further, the management terminal 20 can collect information from the respective controllers 200 and provide required instructions to the respective controllers 200 by way of the communication network CN3.

The storage part 300 comprises a plurality of disk drives 310. For example, a variety of storage devices, such as hard disk drives, flexible disk drives, magnetic tape drives, semiconductor memory drives (flash memory drives and the like), optical disk drives, and holographic memory drives, and the equivalents of these can be utilized as disk drives 310. Further, it is also possible, for example, to mix different types of disk drives, like FC (Fibre Channel) disks and SATA (Serial AT Attachment) disks, inside the storage part 300. In this embodiment, the disk drives 310 will be explained giving hard disk drives as examples.

The respective disk drives 310 each comprise a control circuit 311. The control circuit 311, for example, controls the rotating of the magnetic disks, the driving of the magnetic heads, and so forth based on a pre-stored program (firmware). The control circuit 311 writes data to a magnetic disk and reads data from a magnetic disk on the basis of commands inputted from the subordinate communication part 240. The disk drives 310 are respectively connected to the controllers 200 via respectively different paths CN2. Therefore, should a failure occur in any one of the controllers 200 or paths CN2, data input/output can be carried out by way of the other controllers 200 and paths CN2.

Furthermore, the configuration of the storage control apparatus 100 is not limited to the configuration shown in FIG. 3. For example, it can also be constituted comprising a channel adapter, which communicates with the host 10, a disk adapter, which communicates with the disk drives 310, a cache memory, a shared memory, and a connection control part. The connection control part is a circuit for respectively connecting a channel adapter and a disk adapter to the cache memory and shared memory. Further, the storage control apparatus 100 can also be constituted comprising only one controller 200.

Figure 4:
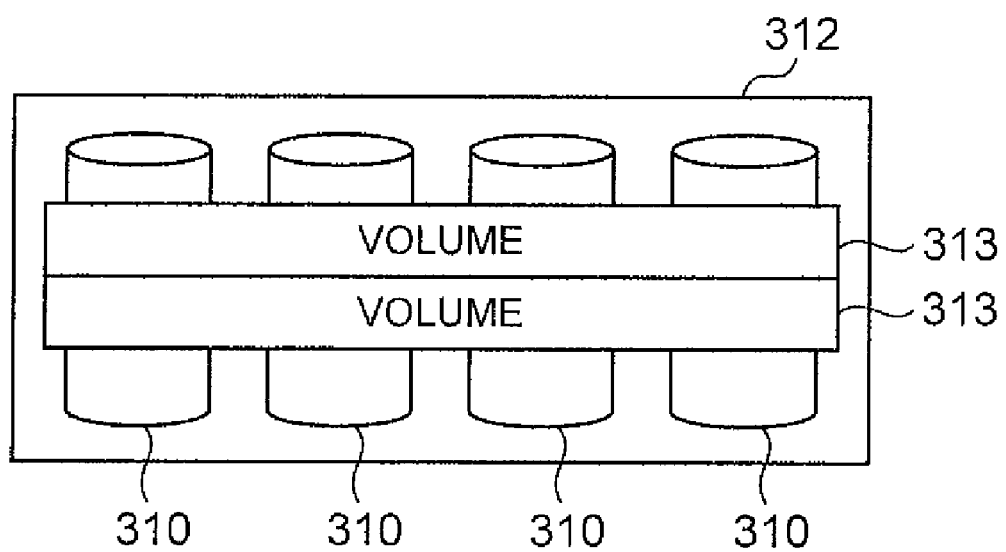
FIG. 4 is a diagram schematically showing the relationship between a disk drive, parity group, and logical volume.

FIG. 4 is a schematic diagram showing the configuration of a redundant storage area. For example, four disk drives 310 can make up a single parity group 312. The parity group 312 is an aggregate of the physical storage areas of the respective disk drives 310, and is a physical storage device. Either one or a plurality of logical volumes 313 can be disposed in this parity group 312. A logical volume 313 is a logical storage device formed by virtualizing a physical storage area.

A host 10 carries out the reading and writing of data by specifying a logical volume 313. A write command and a read command from a host 10 comprise information for specifying a logical volume to be accessed, and a logical address (LBA: Logical Block Address), which denotes either the read destination address or the write destination address of data.

When a parity group 312 comprises a RAID5 configuration, the controller 200 divides write data, and writes it to a plurality of disk drives 310 (data disks). The controller 200 also writes a computed parity to one disk drive 310 (parity disk). The parities are stored in order in the respective disk drives 310. Because parity is used to manage data, even if a failure should occur in one of the disk drives 310, the storage contents of the failed disk drive 310 can be restored based on data and parities read out from the other disk drives 310 in the parity group 312.

Figure 5:
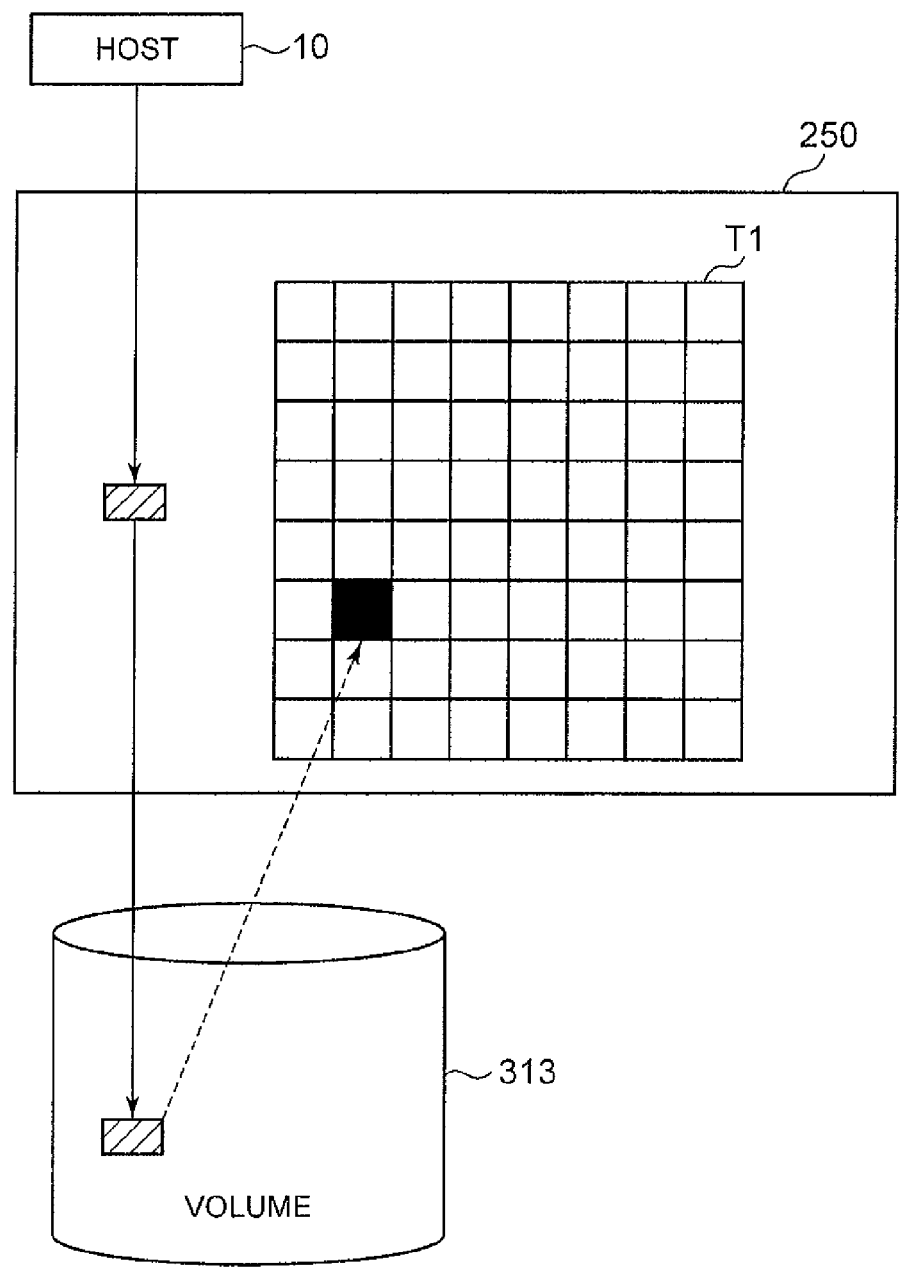
FIG. 5 is a diagram showing a state wherein differences are managed using a difference bitmap.

FIG. 5 is a diagram schematically showing the configuration of a difference bitmap T1. The difference bitmap T1 is for managing differences for the respective logical volumes 313 in the parity group 312. The term difference signifies the difference between the storage contents at a prescribed reference time and the latest storage contents. The prescribed reference time is the start time of difference management.

The difference bitmap T1, for example, is constructed inside the cache memory 250. In addition, a difference bitmap T1 can also be provided inside the flash memory 270. Or, a difference bitmap T1 can also be disposed inside a prescribed logical volume 313.

The difference bitmap T1 manages information as to what location has been updated inside a logical volume 313. The difference bitmap T1, for example, sets an update flag, which denotes the presence of an update, in each prescribed management unit, such as a block unit or a track unit. A management unit in which an update flag is set signifies it has been updated. In FIG. 5, an updated location is shown as a blackened square.

FIG. 6 is a schematic diagram showing an example of a table T2 for managing the parity group 312. This parity group management table T2, for example, can be disposed inside the flash memory 270. The parity group management table T2, for example, is constituted by making a parity group number, RAID level, free space, total size, logical volume number (LU#), and drive list correspond to one another. Items such as access control information, and drive type, for example, can also be added.

The parity group number is information for identifying the respective parity groups 312 inside the storage control apparatus 100. The RAID level is information denoting a type of RAID, such as RAID1 through RAID6. Free space is information denoting the size of the unused storage area in a parity group. The logical volume number is information for identifying the respective logical volumes 313 inside the storage control apparatus 100. The drive list is information for identifying the disk drives 310 that make up a parity group 312 inside the storage control apparatus 100. A parity group management table T2 constituted like this can be used to check which disk drives 310 make up which logical volumes 313.

Figure 7:
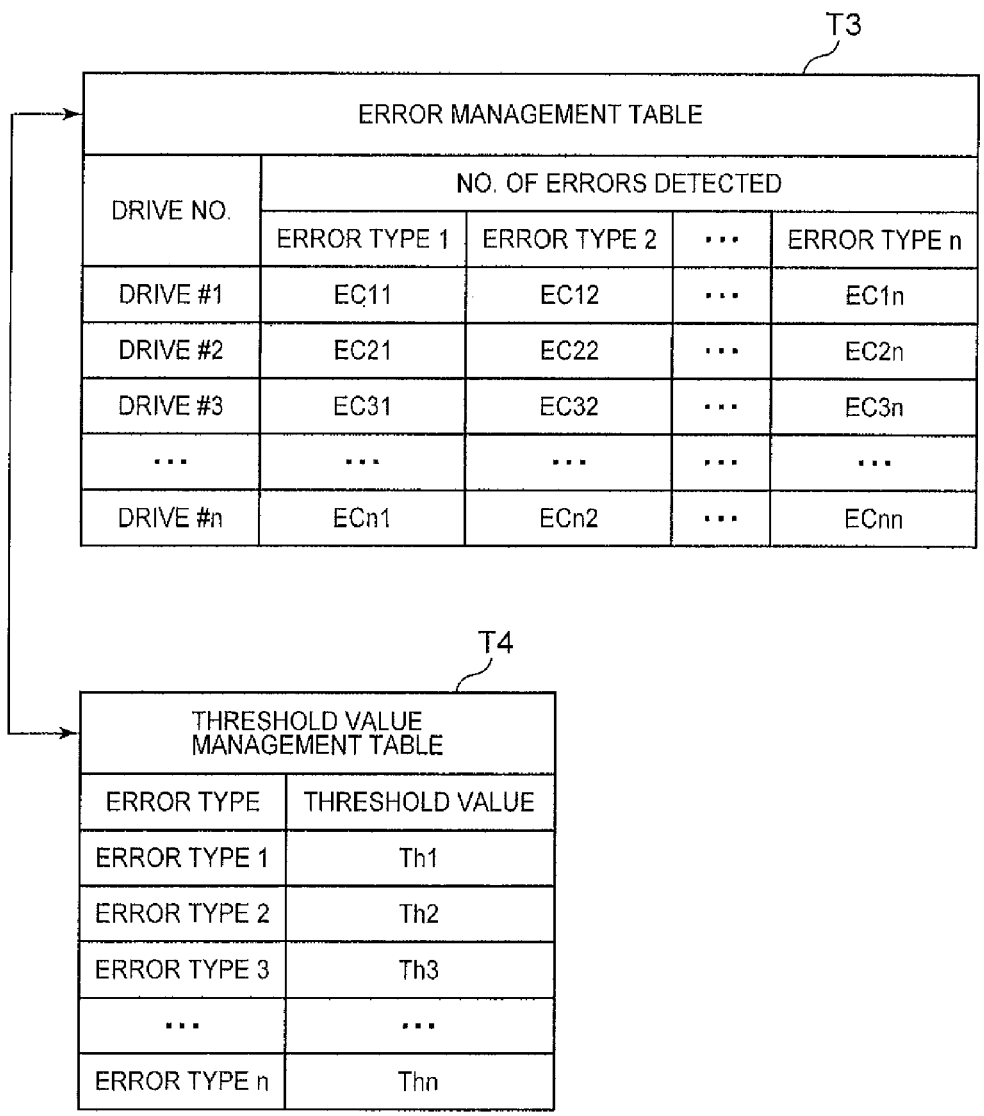
FIG. 7 is a diagram respectively showing a table for managing an error, and a table for managing the threshold value of each error type.

FIG. 7 is a schematic diagram showing an example of a table for managing errors generated in the disk drives 310. This error management table T3, for example, can be disposed inside the flash memory 270. The error management table T3 manages the frequency of occurrence of a plurality of types of errors, which have been set in advance, for each disk drive 310.

The error management table T3, for example, is constituted by making drive numbers and the number of detected errors correspond to one another. As for the number of detected errors, the number of errors is stored by respective error type. The drive number is information for identifying the respective disk drives 310 inside the storage control apparatus 100. An error management table T3 configured like this can be used to check how many of what types of errors are occurring in which disk drives 310.

Furthermore, the error management table T3 is used to manage errors that presage the occurrence of a failure. A failure signifies a state in which the reading and writing of data becomes impossible. The error management table T3 is also capable of managing failures, but manages the errors that presage a failure. Therefore, as will be explained hereinbelow, the reading and writing of data to a disk drive 310 does not become completely impossible even when errors in excess of the threshold value have occurred in this disk drive 310, and it has been determined to be an error drive.

A threshold management table T4 is shown at the bottom of FIG. 7. The threshold management table T4, for example, can be disposed inside the flash memory 270. The threshold management table T4, for example, respectively manages preset threshold values for each error type. The controller 200 determines that an error has occurred in a disk drive 310 when an error of any one of the respective error types reaches this threshold value.

Figure 8:
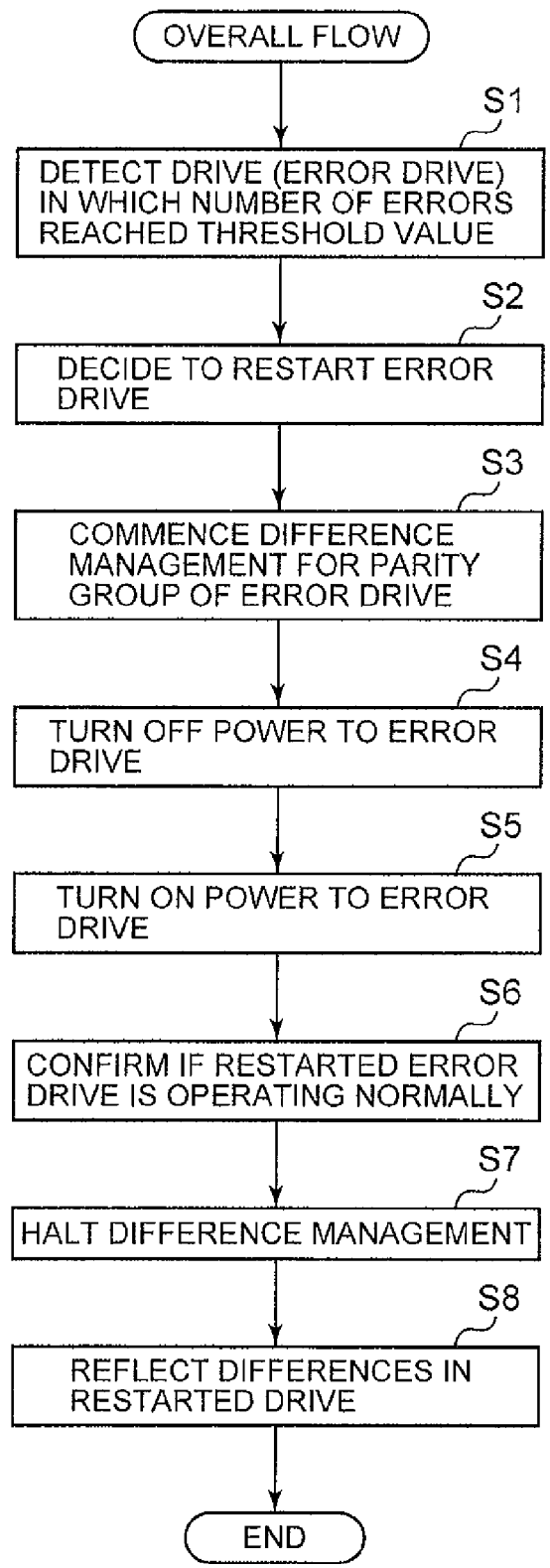
FIG. 8 is a diagram showing the overall flow of a failure recovery method.

FIG. 8 is a schematic diagram showing the overall flow of a failure recovery method of the storage control apparatus 100. Operational details will be described together with other flowcharts. First, the controller 200 detects a disk drive 310 in which the number of errors has reached the threshold value (S1). As described hereinabove, the number of errors that occur in each disk drive 310 is monitored for a plurality of error types, respectively. Furthermore, in the below explanation, the disk drive 310, in which a number of errors in excess of the threshold value was detected, may be called the error drive for convenience sake.

When an error drive is detected, the controller 200 makes the determination to restart this error drive (S2). Then, the controller 200 commences difference management for the parity group 312 to which the error drive belongs (S3). The above-mentioned difference bitmap T1 is used in the difference management.

The controller 200 restarts the error drive after commencing difference management. For example, the controller 200 turns the power to the error drive OFF (S4), and thereafter, turns the power to the error drive ON (S5). In accordance therewith, the control circuit 311 of the error drive reads in the firmware once again and starts up. Furthermore, a situation in which the error drive was restarted by turning the power ON and OFF was described, but it is not limited to this, and the constitution can also be such that the control circuit 311 is reset without turning the power ON and OFF.

Next, the controller 200 confirms whether or not the restarted drive operates normally (S6). When it is operating normally, this disk drive 310 is no longer an "error drive", at this point can be called a "restarted drive". The controller 200 ends the difference management commenced in S3 after confirming that the restarted drive operates normally (S7).

Lastly, the controller 200 reflects the difference, which is being managed in the difference bitmap T1, in the restarted drive (S8). This will be explained more specifically. Several tens of seconds are needed until the error drive is restarted. When a write command is issued from the host 10 to the parity group 312 of the error drive during this restart period, the write data cannot be written to the error drive during a restart. Accordingly, in this embodiment, an updated part generated during the restart period is managed by the difference bitmap T1.

Then, once restart has been completed, the controller 200, based on the data and parity stored in the other disk drives 310 within the parity group 312, restores the data to be stored in the restarted disk drive 310. The controller 200 writes the restored data to the restarted drive. Writing the difference data generated during the restart period (more accurately, during the difference management period) to the restarted drive may be expressed as "reflecting the difference data to the restarted drive".

The fact that needs to be noted here is that not all of the data is restored and written to the restarted drive, but rather, only the difference data is restored and written to the restarted drive. Therefore, it is possible to greatly reduce the time it takes to return the restarted drive to the parity group 312, and to shorten the time needed to recover from a failure.

Figure 9:
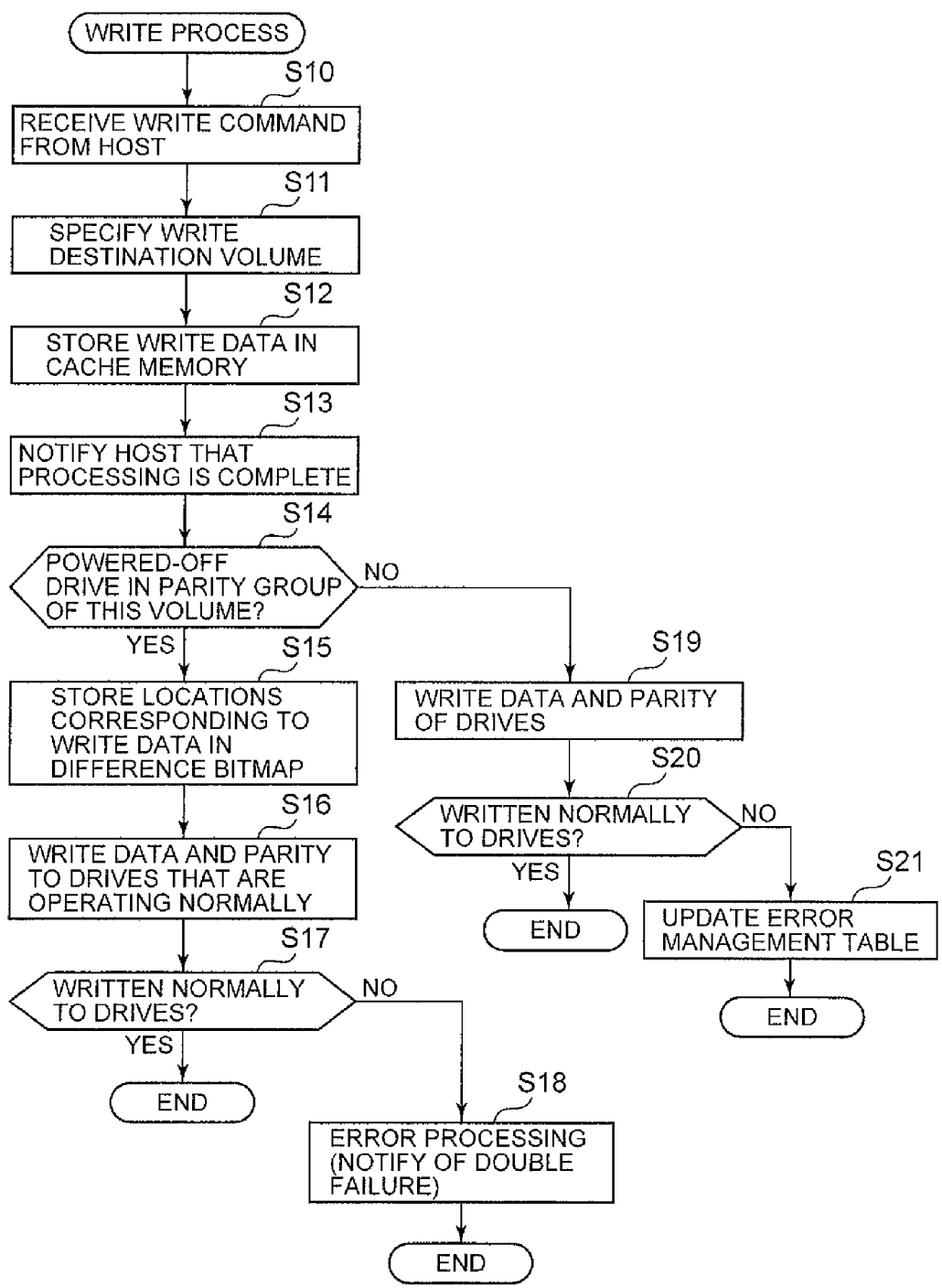
FIG. 9 is a flowchart showing a write process.

FIG. 9 shows a flowchart of the processing of a write command issued from a host 10. Furthermore, the flowcharts described hereinbelow present overviews of processes, but the actual programs may differ. These processes are executed by the controller 200.

The controller 200 receives, via the host communication part 230, a write command issued from the host 10 (S10). The controller 200 specifies the logical volume 313 of the write destination by analyzing the write command (S11), and stores the write data received from the host 10 in the cache memory 250 (S12).

Then, the controller 200 notifies the host 10 to the effect that write command processing is complete (S13). That is, prior to writing the write data to the disk drives 310 that make up the logical volume 313 of the write destination, the controller 200 can notify the host 10 that write command processing is complete. This releases the host 10 from write command processing early.

The controller 200 determines whether or not a disk drive 310, which has had the power turned OFF, exists in the parity group 312 of the write destination logical volume 313 (S14).

When a powered-OFF disk drive 310 exists (S14:YES), the controller 200 stores the location corresponding to the write data stored in S12 in the difference bitmap T1 (S15). The controller 200 writes the write data and parity (hereinafter, may be called data and so forth) to the other disk drives 310, which are operating normally inside the parity group 312 (S16).

The controller 200 determines whether or not data was written normally to the normal disk drives 310, based on notifications from the normal disk drives 310 to which power has not been turned OFF (S17). When writing has ended normally (S17: YES), the controller 200 ends this process. When writing to the normal disk drives 310 fails (S17: NO), the controller 200 carries out error processing (S18). In this error processing, a notification to the effect that a double failure has occurred is sent to the administrator and user.

A double failure is when a write to a plurality of disk drives 310 fails within a single parity group 312. When the determination in S17 is "NO", it is a situation in which power is turned OFF to one disk drive (the error drive) 310 (S14:YES), and data and so forth could not be written to another disk drive 310 for some reason. Accordingly, the controller 200 notifies the management terminal 20 and host 10 that a double failure has occurred.

When errors in excess of the threshold value are detected, the above-mentioned steps S15 through S17 are executed, and difference data is managed for the parity group 312 of the disk drive 310 being restarted (S15).

Conversely, when a disk drive 310, which has had the power turned OFF, does not exist in the parity group 312 of the write destination logical volume 313 (S14: NO), the controller 200 executes an ordinary write process (S19). That is, the controller 200 writes the data and so forth to the disk drives 310 that make up the write destination logical volume 313 (S20), and determines whether or not the write was completed normally (S21). When write is carried out normally to each of the respective disk drives 310 (S21:YES), the controller 200 ends this processing. By contrast, when an error occurs in any one of the respective disk drives 310, and a normal write cannot be performed (S20: NO), the controller 200 updates the error management table T3 (S21). Thus, in an ordinary write process, the presence or absence of an error is monitored when the data and so forth is written to a disk drive 310, and the result of this monitoring is stored in the error management table T3.

Figure 10:
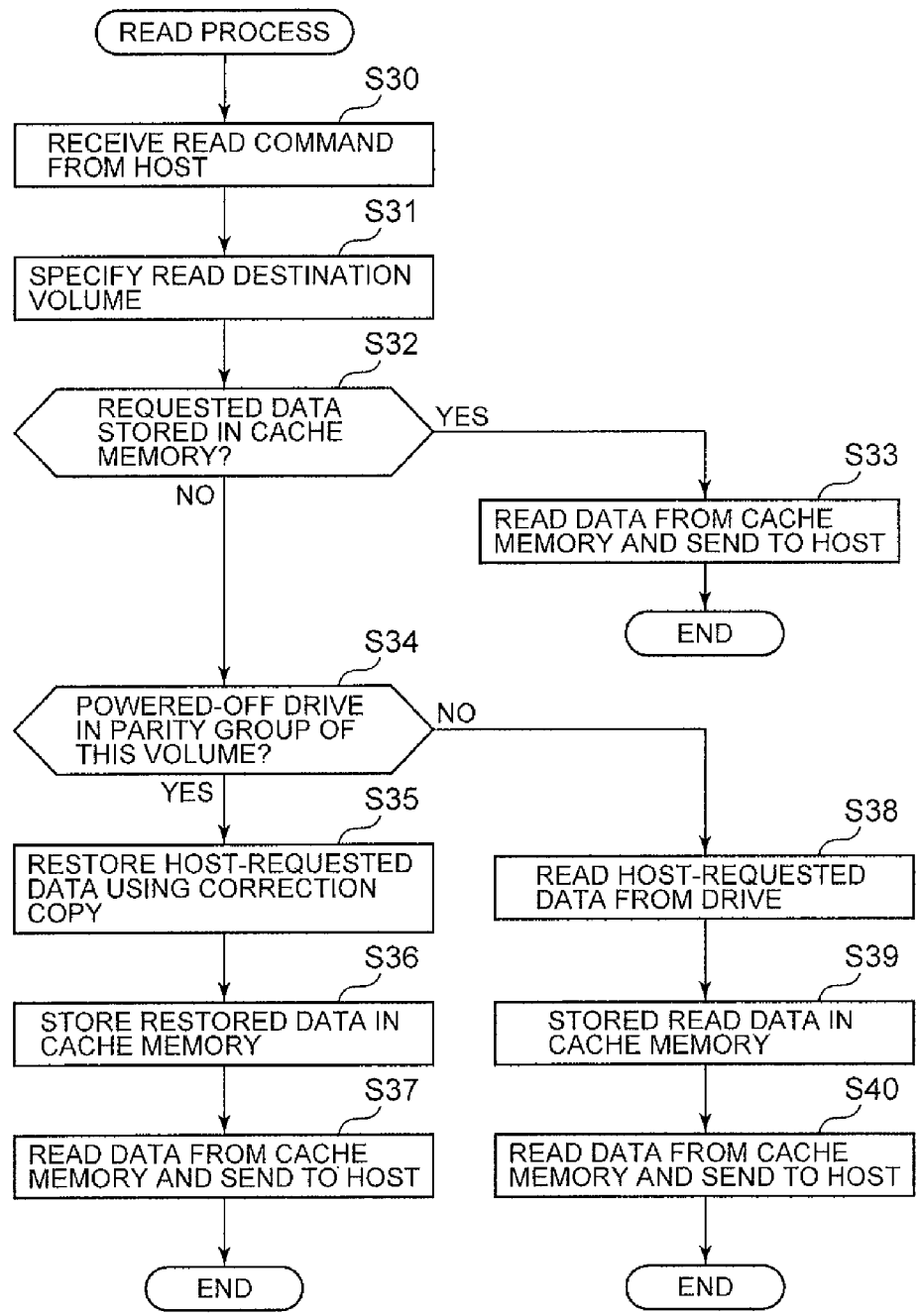
FIG. 10 is a flowchart showing a read process.

FIG. 10 shows a flowchart of the processing of a read command. When a read command is received from the host 10 (S30), the controller 200 specifies the logical volume 313 of the read destination (S31).

The controller 200 determines whether or not the data requested by the host 10 is stored in the cache memory 250 (S32). When the data requested by the host 10 is stored in the cache memory 250 (S32: YES), the controller 200 reads this data out from the cache memory 250, and sends it to the host 10 (S33).

When the data requested by the host 10 is not stored in the cache memory 250 (S32: NO), the controller 200 determines whether or not a disk drive 310, to which the power has been turned OFF, exists inside the parity group 312 of the read-destination logical volume 313 (S34).

That is, when a powered-OFF disk drive 310 exists (S34: YES), it means a disk drive 310 is being restarted to clear an error. The controller 200 reads out the data and so forth from the normal disk drives 310 within the parity group 312, and restores the data requested by the host 10 by virtue of a correction copy (S35). After storing the restored data in the cache memory 250 (S36), the controller 200 sends this data to the host 10 (S37). In other words, when a disk drive 310 that is being restarted is comprised within the parity group 312 of the read-destination logical volume 313, the data requested by the host 10 is generated by a correction copy.

When a disk drive 310, to which the power has been turned OFF, does not exist inside the parity group 312 of the read-destination logical volume 313 (S34: NO), the controller 200 performs ordinary read processing. That is, the controller 200 reads out data from the respective disk drives 310 within this parity group 312 (S38). After combining the data read out from the respective disk drives 310 and storing it in the cache memory 250 (S39), the controller 200 sends this data to the host 10 (S40).

Figure 11:
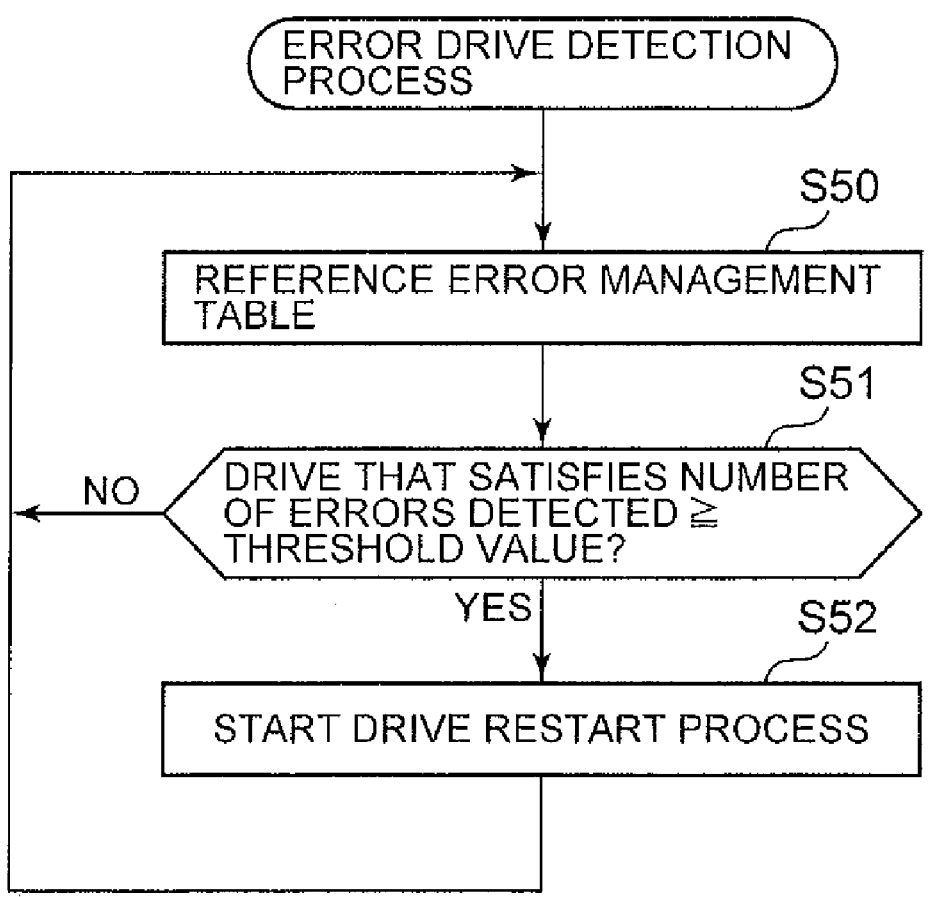
FIG. 11 is a flowchart showing a process for detecting an error drive.

FIG. 11 is a flowchart showing a process for detecting an error drive. The controller 200 references the error management table T3 (S50), and determines whether or not there exists a disk drive 310, in which the number of detected errors has reached a prescribed threshold value (S51).

When the controller 200 finds a disk drive 310 in which the number of errors exceeds the threshold value (S51: YES), it starts processing for restarting this disk drive (also called the error drive) 310 (S52).

Figure 12:
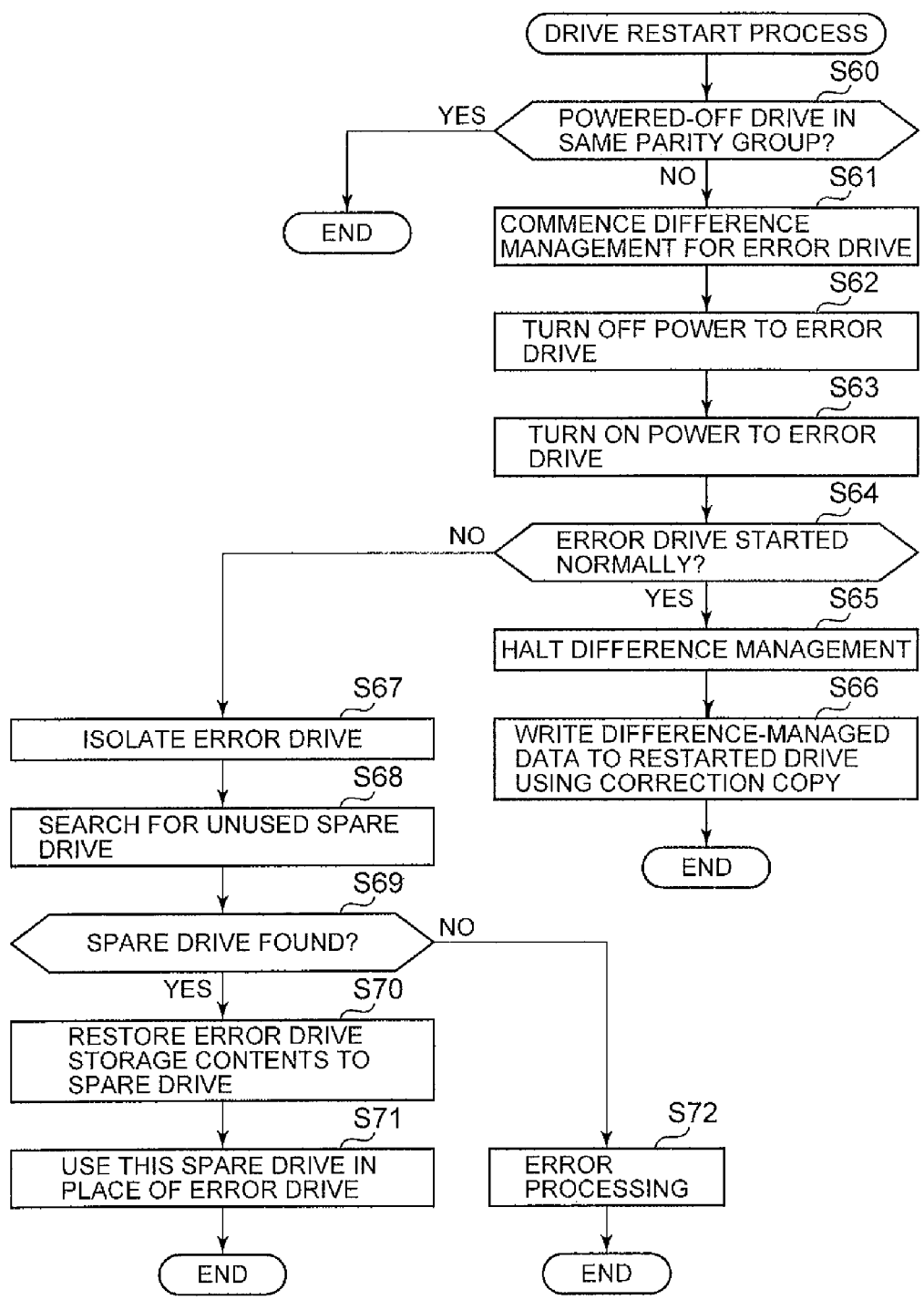
FIG. 12 is a flowchart showing a process for restarting an error drive.

FIG. 12 is a flowchart showing a process for restarting an error drive. First, before restarting the error drive targeted for restart, the controller 200 determines whether or not a disk drive 310, to which the power has been turned OFF, exists within the parity group 312 of this error drive (S60).

If the power to any of the disk drives 310 has been turned OFF beforehand, the above-mentioned double failure could occur when the error drive is restarted. Therefore, when the power has already been turned OFF to any of the disk drives 310 (S60:YES), the controller 200 ends this processing without restarting the error drive.

As explained hereinabove, even when a determination has been made that an error drive exists, the reading and writing of data to the error drive does not become impossible right away. Therefore, an error drive can be restarted after waiting until a disk drive 310 to which the power has been turned OFF beforehand starts normally. In other words, providing S60 makes it possible to restart error drives in order when a plurality of error drives (disk drives for which signs of a failure have been detected) exist within the same parity group 312.

When a disk drive 310, to which the power has been turned OFF, does not exist inside the parity group 312 of an error drive (S60: NO), the controller 200 commences difference management for the error drive (S61). That is, the controller 200 manages, via the difference bitmap T1, the location updated by the host 10 with regard to the parity group 312 of the error drive.

After commencing difference management, the controller 200 sets the power of the error drive to OFF (S62). Next, the controller 200 switches the power to the error drive to ON (S63). This restarts the error drive.

Then, the controller 200 determines whether or not the error drive started normally (S64). For example, the controller 200 can make a determination as to whether or not it started normally based on a status notification from the restarted disk drive (the error drive of prior to restarting). Or, the controller 200 can determine whether or not operation is normal by reading and writing test data to the restarted disk drive.

When the status of the restarted disk drive is normal (64: YES), the controller 200 halts difference management (S65). Then, the controller 200 restores the difference-managed data on the basis of the data and parity read from the normal disk drives 310 within the parity group 312. The controller 200 writes this restored difference data to the restarted disk drive 310 (S66). When all the difference data has been written, the storage contents of this restarted disk drive 310 constitute the most recent state. Thereafter, the restarted disk drive 310 returns to the parity group 312.

By contrast to this, when a normal state is not achieved despite the error drive being restarted (S64: NO), the controller 200 executes error drive isolation processing (S67). Isolation processing is a process, which prohibits access to the error drive, cuts off the error drive from the storage part 300, and shuts off the power to the error drive.

Next, the controller 200 determines whether or not there is an unused spare drive inside the storage part 300 (S68). A spare drive means a spare disk drive 310. The controller 200 searches for a spare drive that has the same or greater storage capacity as the error drive.

When it finds an unused spare drive (S69: YES), the controller 200 selects that spare drive in place of the error drive, and stores data, which was supposed to be stored in the error drive, in the spare drive by virtue of a correction copy (S70). That is, the controller 200 reads out all the data and parities from the normal disk drives 310 within the parity group 312 of the error drive, restores the data that is supposed to be stored in the error drive, and writes that restored data to the spare drive.

After all the data has been written to the spare drive, the controller 200 uses that spare drive in place of the error drive (S71). That is, it adds the spare drive to the parity group 312 by interchanging the drive number of the spare drive and the drive number of the error drive.

When it is not able to find an unused spare drive (S69: NO), the controller 200 carries out error processing (S72). In this error processing, for example, the controller 200 sends messages to the management terminal 20 and host 10 to the effect that an unrecoverable drive failure has occurred, and that there is a lack of spare drives.

In this embodiment, which is constituted like this, the following effect is achieved. In this embodiment, the constitution is such that, when either the occurrence of a failure or an error denoting the signs of a failure in a disk drive 310 is detected, that disk drive 310 (error drive) is restarted one time without treating that error drive as a failed drive right away. Therefore, for example, when the disk drive 310 firmware is simply hung up, it is possible to cancel the error by restarting the disk drive 310. Therefore, the number of incidents handled as failures can be reduced. That is, in this embodiment, the number of failures is reduced, and reliability and usability are enhanced by attempting to cancel an error inside the storage control apparatus 100.

In this embodiment, the constitution is such that difference management is carried out when an error drive is restarted, and only difference data is written to the restarted disk drive 310. Therefore, the storage contents of a restarted disk drive 310 can be quickly restored to the latest status, the time required for failure recovery can be shortened, and usability can be enhanced. In addition, since failure recovery time can be shortened, it is possible to cut down on the increased load put on the storage control apparatus 100 by a correction copy.

In this embodiment, as explained hereinabove, restarting a disk drive inside the storage control apparatus 100 can reduce the number of failures recognizable from outside the storage control apparatus 100. Therefore, it is possible to reduce the number of spare drives utilized. This does away with the need to mount a large number of spare drives to the storage control apparatus 100 in advance, making it possible to reduce storage control apparatus 100 installation and operation costs.

In particular, there could also be circumstances when a user is prohibited from replacing or adding a disk drive 310 to the storage control apparatus 100, in which case, using up all the spare drives will make it impossible to deal with drive failures that occur afterwards. That is, once all the spare drives have been used, the life of the storage control apparatus 100 is over. Even under circumstances such as this, since this embodiment makes it possible to reduce the number of failures, and cut down on the consumption of spare drives, the life of the storage control apparatus 100 can be lengthened.

In this embodiment, difference management is commenced prior to restarting an error drive, and difference management is stopped after ascertaining that the error drive is operating normally. This can prevent the loss of data during the restart period, and make it possible to maintain reliability.

Furthermore, the present invention is not limited to the above-mentioned embodiments. A person skilled in the art will be able to make various additions and changes without departing from the scope of the present invention.

What is claimed is:

1. A storage control apparatus which comprises a plurality of storage devices, and a controller for controlling the plurality of storage devices, wherein the controller comprises:
   a command processing part which processes a command received from a host computer, and sends processing results to the host computer;
   an error management part which manages errors that occur in the storage devices, and detects a prescribed storage device to be restarted based on errors detected for the prescribed storage device; and
   a restart control part which sets power to the prescribed storage device to an OFF state, subsequently sets power to the prescribed storage device to an ON state, determines whether the prescribed storage device has restarted normally and, if the prescribed storage device has not restarted normally, isolates the prescribed storage device.

2. The storage control apparatus according to claim 1, further comprising:
   a difference management part which, when the command processing part processes a write command related to a parity group of the prescribed storage device, manages updated locations resulting from the write command within a prescribed difference management period comprising a period for restarting the prescribed storage device.

3. The storage control apparatus according to claim 1, wherein:
   after the prescribed storage device is isolated, a spare storage device is added to a parity group of the prescribed storage device and used in place of the prescribed storage device.

4. The storage control apparatus according to claim 1, wherein:
   if the prescribed storage device has been isolated, access to the prescribed storage device is prohibited.

5. The storage control apparatus according to claim 3, wherein:
   the plurality of storage devices comprise at least one or more unused spare storage devices; and
   the spare storage device is selected from the at least one or more unused spare storage devices.

6. The storage control apparatus according to claim 3, wherein:

the spare storage device has the same or equal storage capacity as the prescribed storage device.

7. The storage control apparatus according to claim 2, wherein:
the restart control part which, subsequent to the end of the difference management period, restores the updated location data based on data respectively stored in storage devices other than the prescribed storage device within the parity group, and writes the restored data to the prescribed storage device.

8. The storage control apparatus according to claim 5, wherein:
if no unused spare storage device having the same or greater storage capacity as the prescribed storage device can be found, then an error message is sent to the host computer.

9. The storage control apparatus according to claim 1, wherein
the error management part detects the prescribed storage device to be restarted when a number of errors of the prescribed storage device exceeds a threshold value.

10. The storage control apparatus according to claim 1, wherein
the restart control part restores the contents of the prescribed storage device to a spare storage device on the basis of all the data stored respectively in storage devices other than the prescribed storage device within a parity group including the prescribed storage device.

11. A method for recovering from a failure in a storage control apparatus, which comprises a plurality of storage devices, and a controller for controlling the storage devices, the method comprising the steps of:
managing respective errors that occur in the storage devices;
detecting a prescribed storage device to be restarted based on errors detected for the prescribed storage device;
setting the power to the prescribed storage device to an OFF state;
setting the power to the prescribed storage device to an ON state; and
determining whether the prescribed storage device has restarted normally;
isolating the prescribed storage device, if the prescribed storage device is determined to have failed to restart normally.

12. The method for recovering from a failure in a storage control apparatus according to claim 11, further comprising the step of:
commencing difference management related to the parity group of the prescribed storage device before determining whether the prescribed storage device has restarted normally.

13. The method for recovering from a failure in a storage control apparatus according to claim 11, wherein:
if the prescribed storage device is isolated, prohibiting access to the prescribed storage device.

14. The method for recovering from a failure in a storage control apparatus according to claim 11, further comprising the step of:
writing the restored data to a spare storage device on the basis of the data stored respectively in storage devices other than the prescribed storage device within a parity group including the prescribed storage device, wherein the spare storage device has the same or equal storage capacity as the prescribed storage device.

15. The method for recovering from a failure in a storage control apparatus according to claim 14, wherein:
the plurality of storage devices includes at least one or more unused storage devices; and
the spare storage device is selected from a plurality of unused storage devices.

16. The method for recovering from a failure in a storage control apparatus according to claim 12, further comprising the steps of:
halting the difference management when the prescribed storage device has restarted normally; and
restoring the difference managed data on the basis of data respectively stored in storage devices other than the prescribed storage device within the parity group, and writing the restored data to the prescribed storage device.

17. The method for recovering from a failure in a storage control apparatus according to claim 12, wherein the prescribed storage device is detected to be restarted when a number of errors of the prescribed storage device exceeds a threshold.

18. A storage control apparatus comprising:
a plurality of storage devices; and
a controller for controlling the plurality of storage devices, wherein the controller processes a command received from a host computer, and sends processing results to the host computer, manages errors that occur in the storage devices, detects a prescribed storage device to be restarted based on errors detected for the prescribed storage device, sets power to the prescribed storage device to an OFF state, subsequently sets power to the prescribed storage device to an ON state, determines whether the prescribed storage device has restarted normally and, if the prescribed storage device has not restarted normally, isolates the prescribed storage device.

19. The storage control apparatus according to claim 18, wherein
the controller, when processing a write command related to a parity group of the prescribed storage device, manages updated locations resulting from the write command within a prescribed difference management period comprising a period for restarting the prescribed storage device.

20. The storage control apparatus according to claim 18, wherein:
after the prescribed storage device is isolated, a spare storage device is added to a parity group of the prescribed storage device and used in place of the prescribed storage device.

* * * * *